H. M. GUSDORF.
TWO-PLY PIGSKIN BELT.
APPLICATION FILED OCT. 4, 1920.

1,404,848.

Patented Jan. 31, 1922.

Inventor,
Harold M. Gusdorf,
By Joseph A. Minturn
Attorney

UNITED STATES PATENT OFFICE.

HAROLD M. GUSDORF, OF INDIANAPOLIS, INDIANA.

TWO-PLY PIGSKIN BELT.

1,404,848.  Specification of Letters Patent.  Patented Jan. 31, 1922.

Application filed October 4, 1920. Serial No. 414,713.

*To all whom it may concern:*

Be it known that I, HAROLD M. GUSDORF, a citizen of the United States, residing at Indianapolis, in the county of Marion and State of Indiana, have invented new and useful Improvements in Two-Ply Pigskin Belts, of which the following is a specification.

This invention relates to the construction of belts for pulleys from a material having a firm close texture on one side and a porous and more or less loose and open texture on the other, the object of the invention being to provide a belt with a firm non-elastic middle between two sides that adjust themselves in density and area in passing around pulleys, the pores or cups of the material being advantageous for the reason that the vacuum action resulting from their compression against the pulley face increases the adhesion of the belt thereto.

I accomplish the above and other objects which will hereinafter appear, by the means partially illustrated in a diagrammatic way in the accompanying drawing, in which—

Figure 1:
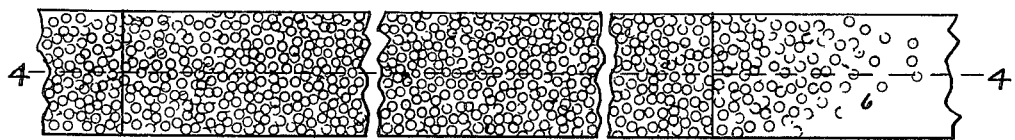
Figure 2:
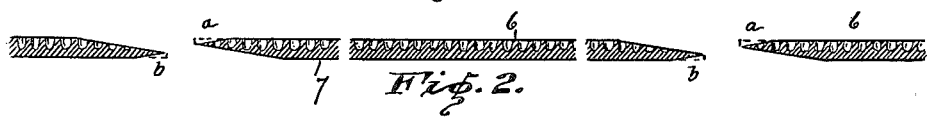
Figure 4:
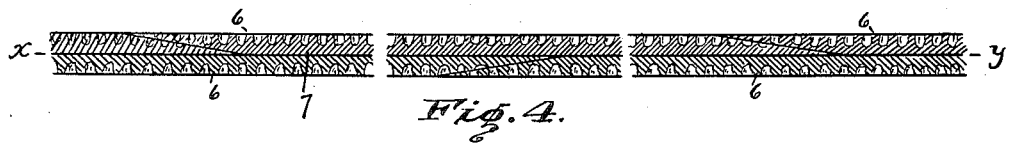
Figure 3:
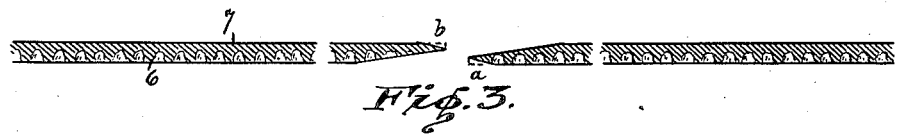
Figure 5:
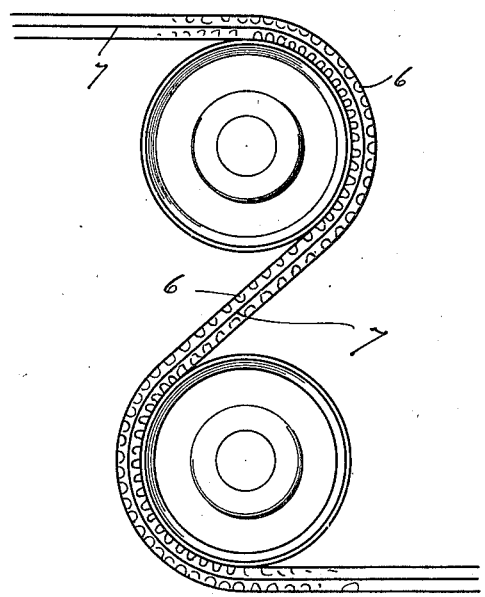

Fig. 1, is the side view of a belt made out of pig-skin or other material having the stated characteristics. Fig. 2, is a longitudinal section of one of the leather thicknesses or plies with the lap-ends shaped ready to be joined. Fig. 3, is a like view of the other ply for a complete belt. Fig. 4 is a like sectional view of the two plies of Figs. 2 and 3, united to form a finished product, and Fig. 5 illustrates the use of the belt in driving pulleys and shows the expansion and contraction of the cupped belt surfaces.

Like characters of reference indicate like parts in the several views of the drawing.

The material which I use most in practice is pig-skin leather tanned in a manner to preserve and retain the multiplicity of cup-like formations existing on the inner side of the skin of the pig, but the conditions can be artificially produced with canvas coated with rubber or other material.

The outer side of the skin of a pig is comparatively firm and solid so that leather properly tanned from it is open and porous on one side and firm and close on the other. The porous side will expand and contract readily by the opening and closing of its cups or pores, while the other side will retain its dimensions. I have discovered that the ideal belt is produced by cementing the two firm sides (the original outsides of the skin) together. This outside of the skin is commercially known as the grain side.

As pig skins are not long enough to supply very long belt strips, it is necessary to splice or join them together; and this must be done in a particular way in order to make the belt uniformly more durable because of the varying properties of the hide for different parts thereof, the firmest portions being such as come from over the hams of the animal and the less firm such as come from over the shoulders. Therefore, in making up one of the plies for a double thickness or two-ply belt, I join the shoulder or less firm end of one strip to the ham or firmer end of the next strip. The joint is made by bevelling the adjacent ends and lapping and cementing the bevelled portions. Preferably the bevel is made on both sides of the strip to blunt the end and remove a weak feather $a$ on the porous side and an excessively harsh end $b$ on the other. In cementing the two strips thus made up, into a two-ply belt, the joints are staggered so an uncut piece of leather will occur opposite each joint, as illustrated in Fig. 4, where it will be observed that the porous sides 6 are turned outermost and the firm sides 7 are together, thereby producing an unyielding middle on the line $x$—$y$, which will maintain the size of the belt while the cups 6 and 7 will afford pliability and adhesion to the pulleys. In cementing, the ham end of one piece is cemented to the shoulder end of the next piece, the greatest bevels being placed together with the greatest bevel on the ham end running from the flesh side to the point made by the two bevels at that end, and the greatest bevel of the shoulder end running from the outer grain side to the point.

In forming a cemented joint between the two ends of a one-piece pig-skin belt the leather is preferably cut on both sides obliquely as above described for a two-ply one. By so-doing the feather of the porous side is not incorporated in the joint to weaken it. In a one-ply pig-skin belt the firm or ham-end is joined to the less firm or shoulder end as above provided.

What I claim is—

1. As a new article of manufacture, a two-ply belt formed of pig-skin strips with their firm outer sides adhesively united.

2. As a new article of manufacture, a two-ply belt formed of pig-skin with the firm outer sides of the skin adhesively united, said plies being formed of jointed strips bevelled at their joints on both sides of the ply, the joints of the two plies being staggered.

3. As a new article of manufacture, a two-ply belt formed of pig-skin with the firm outer sides of the skin adhesively united, said plies being formed of jointed strips bevelled on both sides at their joints, the ham end of each strip being joined to the shoulder end of the next.

4. As a new article of manufacture, a belt formed of pigskin strips in which the ham-end of each strip is joined to the shoulder-end of the next.

5. As a new article of manufacture, a two-ply belt formed of pigskin strips with their grain sides adhesively united, the ham-end of each strip being joined to the shoulder-end of the next.

6. As a new article of manufacture, a belt formed of pigskin strips with the ham-end of one strip adhesively united to the shoulder-end of the next, the pulley-contacting surface which is the looser side being indented with cup-like openings.

7. A joint for belts of pig-skin cut from ham to shoulder, said strips bevelled on both sides for a lap and the ham end of one strip joined to the shoulder end of the next by lapping and cementing together their portions of greatest bevel.

8. A joint for belts of pig-skin cut from ham to shoulder, said strips bevellel on both sides to a point but to a much longer bevel on the joint-contacting portions, the greatest bevel on the ham end running from the flesh side to a point and the greatest bevel on the shoulder end running from the outer grain side to a point and the joint being formed by lapping and cementing together the portions of greatest bevel with the ham end of one strip cemented to the shoulder end of the next strip.

Signed at Indianapolis, Indiana, this 30th day of September, 1920.

HAROLD M. GUSDORF.